United States Patent [19]

Ching

[11] Patent Number: 5,415,079

[45] Date of Patent: May 16, 1995

[54] COMPOSITE CYLINDER FOR USE IN AIRCRAFT HYDRAULIC ACTUATOR

[75] Inventor: Fred Y. Ching, Canyon Country, Calif.

[73] Assignee: HR Textron, Inc., Valencia, Calif.

[21] Appl. No.: 881,582

[22] Filed: May 13, 1992

[51] Int. Cl.⁶ .................. F01B 11/02; F16J 10/00
[52] U.S. Cl. .................. 92/169.2; 92/170.1; 92/171.1
[58] Field of Search ............. 92/169.1, 169.2, 170.1, 92/171.1

[56] References Cited

U.S. PATENT DOCUMENTS

| | | | |
|---|---|---|---|
| 3,537,484 | 11/1970 | McLarty | 138/109 |
| 4,039,006 | 8/1977 | Inoue et al. | 138/129 |
| 4,132,382 | 1/1979 | Jackson | 251/5 |
| 4,189,985 | 2/1980 | Harris | 92/170.1 X |
| 4,685,384 | 8/1987 | Dirkin et al. | 92/166 |
| 4,697,499 | 10/1987 | Dirkin et al. | 92/151 |
| 4,773,306 | 9/1988 | Dirkin | 92/151 |
| 4,802,404 | 2/1989 | Dirkin | 92/171 |
| 4,867,044 | 9/1989 | Holtrop | 92/169.1 |
| 4,971,846 | 11/1990 | Lundy | 92/171.1 X |

FOREIGN PATENT DOCUMENTS

| | | | |
|---|---|---|---|
| 0239407 | 9/1987 | European Pat. Off. . | |
| 0312023 | 4/1989 | European Pat. Off. . | |
| 0365391 | 4/1990 | European Pat. Off. . | |
| 0377382 | 7/1990 | European Pat. Off. . | |
| 2319294 | 11/1974 | Germany | 92/169.1 |
| 3231120 | 3/1983 | Germany | 92/169.1 |
| 3904644 | 3/1990 | Germany . | |
| 0199147 | 6/1923 | United Kingdom | 92/169.1 |
| WO91/11319 | 8/1992 | WIPO . | |

Primary Examiner—Edward K. Look
Assistant Examiner—Hoang Nguyen
Attorney, Agent, or Firm—Robbins, Berliner & Carson

[57] ABSTRACT

A composite cylinder constructed from a cylindrical liner having an outer surface which is dome shaped adjacent each end. A plurality of layers of resin impregnated carbon filaments are wound on the outer surface of the liner and over the dome shaped portions. Preferably the filaments are helically wound and are wound at an angle with respect to the access of the cylindrical liner such that radial stress as applied during operation will not tend to displace the filaments wound over the dome shaped portions of the liner. The composite cylinder is useful as an integral part of a hydraulic actuator used to position flight control surfaces on aircraft.

5 Claims, 2 Drawing Sheets

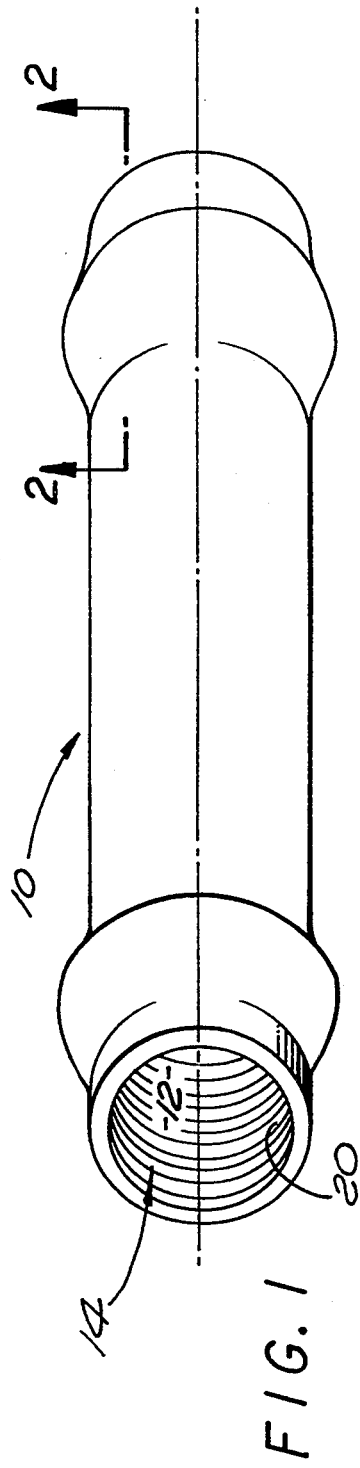
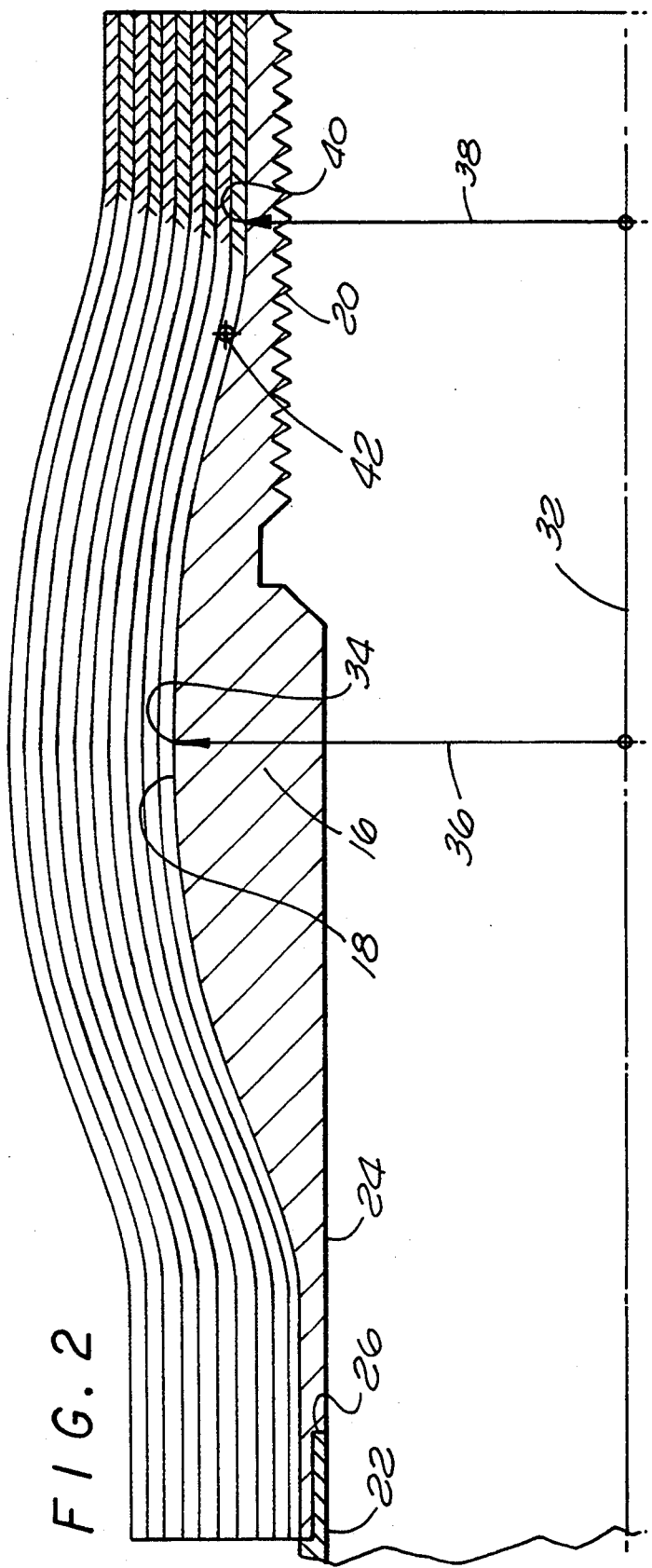

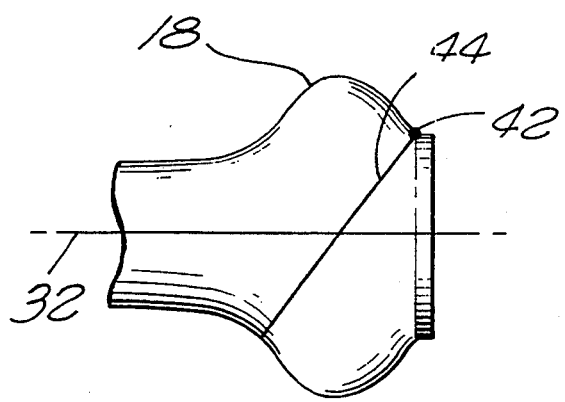
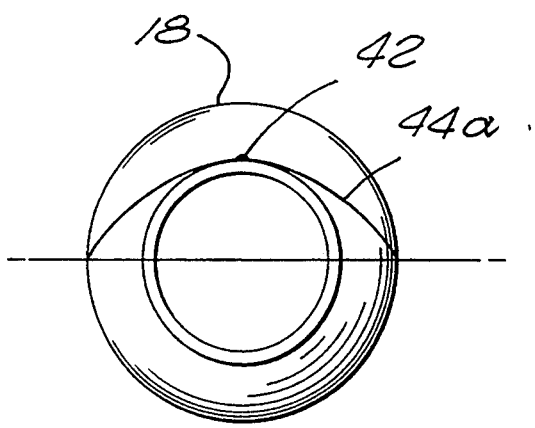
FIG. 3    FIG. 4
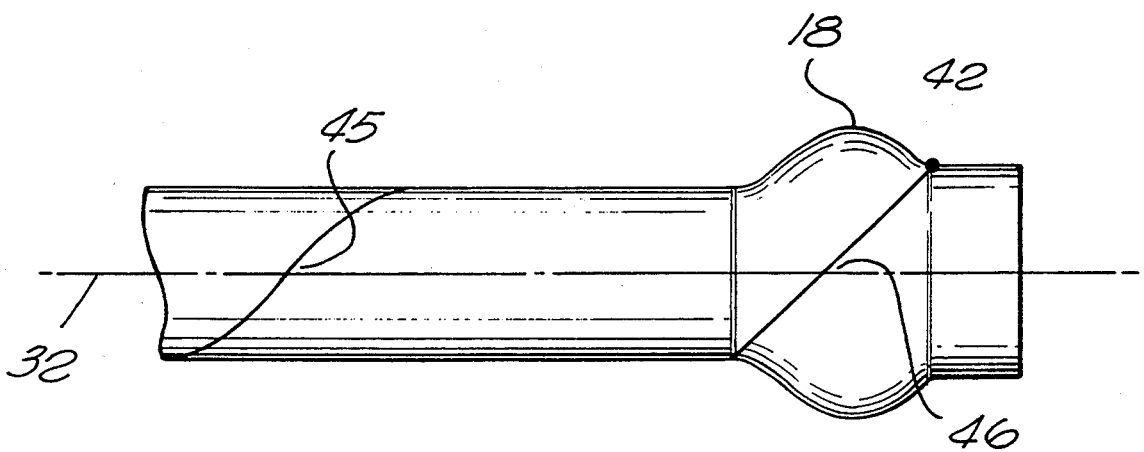
FIG. 5

COMPOSITE CYLINDER FOR USE IN AIRCRAFT HYDRAULIC ACTUATOR

BACKGROUND OF THE INVENTION

1. Field of the Invention

This invention relates generally to fluid actuators and more particularly to a composite cylinder for use in hydraulic actuators intended for aircraft flight controls.

2. Prior Art

Fluid actuators of the type used in flight controls for aircraft and other high pressure applications are required to withstand high impulse pressures without failing over extended periods of time. In the prior art, to insure that the actuator had the necessary strength, common practice has been to construct the actuator cylinder out of a monolithic metal piece. Such structure adds considerably to the weight of the actuator.

To provide actuator cylinders having lighter weight than those constructed with a monolithic metal piece but at the same time providing adequate strength, the use of a composite cylinder has been suggested. Typical of such composite cylinders are those disclosed in prior art U.S. Pat. Nos. 4,685,384, 4,697,499, 4,802,404, and 4,773,306. The composite cylinders disclosed in these patents include a metal liner which is wound with hoop windings made of a suitable composite fiber such as a graphite filament impregnated with a suitable resin. The filaments, in addition to being hoop wound, have also been helically wound, and in some instances, disposed in longitudinal winding form. The combination of the hoop, helical and longitudinal windings provide the ability for the composite cylinder to react to circumferential loads, axial loads and compressive loads generated in the cylinder during the operation of the hydraulic actuator.

Although such composite cylinders have functioned quite well for the purposes intended, difficulties have been experienced in that the windings are incapable of supporting the loads encountered in all instances. Such difficulties have been generated because of the manner of retaining the wound filaments on the liner and particularly on the metal end glands necessary for receiving end plates which in turn receive the piston rods or clevis attachment members necessary for proper operation of the hydraulic actuator.

SUMMARY OF THE INVENTION

A composite cylinder for use in a hydraulic actuator and comprising a cylindrical liner having an outer surface which is dome shaped adjacent each end thereof. A plurality of layers of resin impregnated carbon filaments are wound on the outer surface of the liner and over the dome shaped portions. At least two of the plurality of layers are helically wound at an angle with respect to the axis of the cylindrical liner such that radial stress as applied during actuator operation will not tend to displace the helically wound filaments on the dome shaped portions of the liner.

BRIEF DESCRIPTION OF THE DRAWINGS

FIG. 1 is a perspective view illustrating a composite cylinder constructed in accordance with the principles of the present invention; and FIG. 2 is a fragmented partial cross sectional view illustrating the end portions of the composite cylinder as shown in FIG. 1 and taken about the lines 2—2 thereof.

FIG. 3 is a schematic representation of one end of the cylinder illustrating a geodesic path taken by fiber winding;

FIG. 4 is a right end view of the illustration of FIG. 3 further illustrating the geodesic path taken by the fiber; and FIG. 5 is a schematic representation of a portion of the cylinder illustrating the helical paths taken by the fibers during winding and illustrating the shallower angle taken by the fiber when the winding starts at an increased diameter.

DETAILED DESCRIPTION

The composite cylinder constructed in accordance with the principles of the present invention is adapted for use as an integral part of a hydraulic actuator used for the flight control surfaces on aircraft. Such actuators may be used either as single or as dual tandem actuators as is well known in the prior art. Such actuators include a cylinder which receives a piston and piston rod with the ends of the cylinder being closed by a tail stock and a gland which typically are threaded into opposite ends of the cylinder. Appropriate fluid inlet and outlet passageways and mounting means are included as would be position indicators such as linear variable differential transformers (LVDT). The entire apparatus is not illustrated nor described in detail herein since such is well known to those skilled in the art. For the sake of completeness, the disclosures of U.S. Pat. Nos. 4,685,384, 4,697,499, 4,773,306, and 4,803,404 are incorporated herein by reference.

The composite cylinder of the present invention includes an integral thin walled liner which terminates at each end in threaded end sections to receive the threaded tail stock and gland. The integral liner has a dome shaped outer surface at each end and is wound with a plurality of layers of impregnated carbon fibers to provide the overall additional strength required in a hydraulic actuator used to position aircraft flight controls while at the same time providing a substantial weight reduction. Through utilization of a composite cylinder constructed in accordance with the principles of the present invention, an overall actuator weight reduction of approximately fifteen percent (15%), as compared to metal actuators, has been realized.

The metal liner is preferably constructed of stainless steel (15-5 PH) and may include a central barrel with separate end fittings which are assembled upon a mandrel for winding. The filament used in winding is preferably a carbon fiber which has been impregnated with an epoxy resin including an appropriate curing agent and a curing accelerator as is well known to those skilled in the art. The windings are placed on the outer surface of the integral liner and are preferably helically wound but may also include layers of hoop wound filaments interspersed between the helically wound layers. Helically wound layers are disposed particularly over the dome shaped portions of the cylindrical liner in such a manner that radial stress applied during actuator operation will not tend to displace the helically wound filaments on the dome shaped portions of the liner. Preferably, the layers of filament would be wound continuously without cutting or breaking the filament.

A composite cylinder constructed in accordance with the present invention is shown in the drawings at 10 and includes a liner 12 having threaded end portions 14 which include an enlarged portion 16 providing a dome shaped outer surface 18. Threads 20 are formed in the outer end sections of the liner to threadably receive the tail stock and end gland.

As is illustrated more particularly in FIG. 2, the integral liner may include a central barrel 22 which is assembled with a pair of end fittings 24 as is shown by the shoulder 26 after which the windings are disposed upon the outer surface thereof. As is also shown particularly in FIG. 2, the composite cylinder includes a plurality of windings generally designated at 30. These windings preferably are helical and are disposed during winding such that the filament is at a relatively shallow angle with respect to the longitudinal axis 32 of the cylinder. Although the plurality of layers 30 are preferably helically wound, they may also include hoop wound layers interspersed between the helical layers should such be desired.

As above pointed out, the helical windings are disposed upon the dome shaped outer surface 18 in such a manner that radial stresses when applied during actuator operation will not tend to displace the helical wound filaments on the dome shaped portion. This is accomplished by winding the filament in a geodesic manner over the dome shaped outer surface 18. The geodesic path taken by the filament is shown at 44 in FIGS. 3 and 4. The winding would commence at the point 42 and then helically traverse the cylinder to its opposite end and then return adjacent the starting point 42 as is shown at 44A in FIG. 4. The preferred angle of the filament with respect to the longitudinal axis of the cylinder at the commencement of the winding depends upon the distance the outer surface of the dome portion 18 is displaced from the center line 32 as compared to the outer surface of the remainder of the liner. As is shown in FIG. 2, the radius from the longitudinal axis 32 to the apex 34 of the dome portion 18 is a major radius as shown at 36. A minor radius as shown at 38 is the distance from the longitudinal axis 32 to the outer surface of the liner immediately adjacent the dome shaped portion 16 as noted at 40 which is at the greatest thickness of the remainder of the liner other than the dome shaped portion. The angle at which the filament would be placed to commence winding at the point 42 would be determined by the formula $$W = \sin^{-1} \frac{R \text{ minor}}{R \text{ major}}$$

where
W = winding angle
R minor = minor radius
R major = major radius

It will be recognized by those skilled in the art that as the layers of filament are wound upon the outer surface of the liner, the overall diameter of the liner continuously increases. The angle at which the helically wound filaments are wound will decrease as each layer is displaced further from the longitudinal axis by establishing the commencement winding angle as above described. As is shown in FIG. 5 the fiber being wound upon the cylinder forms an angle 45 with respect to the longitudinal axis 32 of the cylinder. If the filament winding starts from a point further displaced from the longitudinal axis 32 as is shown adjacent the domed-shaped portion 18 at 42 then the angle 46 formed with the longitudinal axis 32 is less than the angle 45. That is the angle has decreased because that filament is displaced further from the longitudinal axis 32. The helically wound filaments are disposed over the dome shaped portions in a geodesic manner and thus will retain their positions upon the dome shaped portions irrespective of the operational stresses applied to the actuator during flight.

As is well known to those skilled in the art, once the epoxy impregnated carbon filaments have been wound upon the outer surface of the cylindrical liner, which itself has been positioned upon a winding mandrel, the entire unit, mandrel included, is cured in an oven at an elevated temperature. The curing temperature must be higher than the highest operational temperature to which the actuator will be subjected. After the curing process, the cylinder is separated from the mandrel and is then ready for use or alternatively for further operations preparatory to final assembly for use as the case may be.

What is claimed is:

1. A composite cylinder for use in a hydraulic actuator comprising:
    (A) a cylindrical barrel having a longitudinal axis, a first outer surface, and first and second ends;
    (B) a first end fitting disposed at said first end of said barrel, said first end fitting having a second outer surface including a first dome shaped portion having a first apex and a first threaded inner surface extending from an outer edge thereof;
    (C) a second end fitting disposed at said second end of said barrel, said second end fitting having a third outer surface including a second dome shaped portion having a second apex and a second threaded inner surface;
    (D) a plurality of layers of resin impregnated carbon filaments wound on said outer surface and said first and second dome shaped outer surfaces, at least two of said filament layers being helically wound with said filament disposed at a shallow angle with respect to said longitudinal axis;
    (E) a major radius defined by the distance from said axis to said first apex;
    (F) a minor radius defined by the distance from said axis to said second outer surface of said first end fitting adjacent said outer edge thereof; and
    (G) said helically would filament starting at a point adjacent said outer edge at an angle with respect to said axis determined by the formula $$W = \sin^{-1} \frac{R \text{ minor}}{R \text{ major}}$$

where
W = winding angle
R minor = minor radius
R major = major radius
and continuing toward said barrel in a geodesic pattern over said first dome shaped surface.

2. A composite cylinder as defined in claim 1 wherein all of said plurality of layers are wound with a continuous filament.

3. A composite cylinder as defined in claim 2 wherein said layers of filaments include hoop wound layers interspersed between said helically wound layers.

4. A composite cylinder as defined in claim 3 wherein the angle at which each said helically wound filament layer is wound decreases as said layer is displaced further from said axis.

5. A composite cylinder as defined in claim 4 wherein said cylindrical barrel and said first and second end fittings are separate, each said end fitting defining a shoulder for receiving said barrel.

* * * * *